March 7, 1950     M. E. COLLINS     2,499,850
FILM REEL DRIVE
Filed March 26, 1947
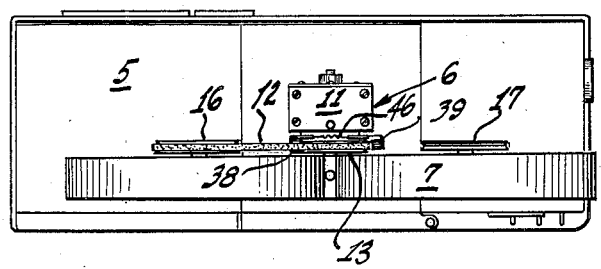
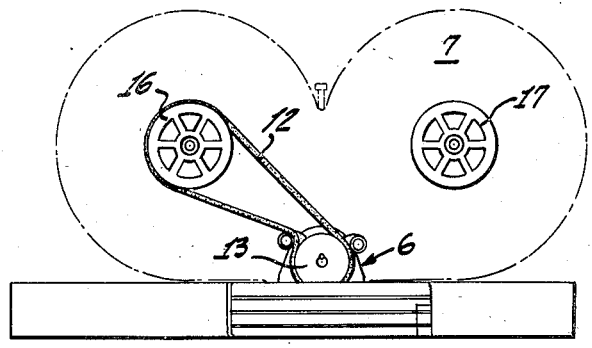
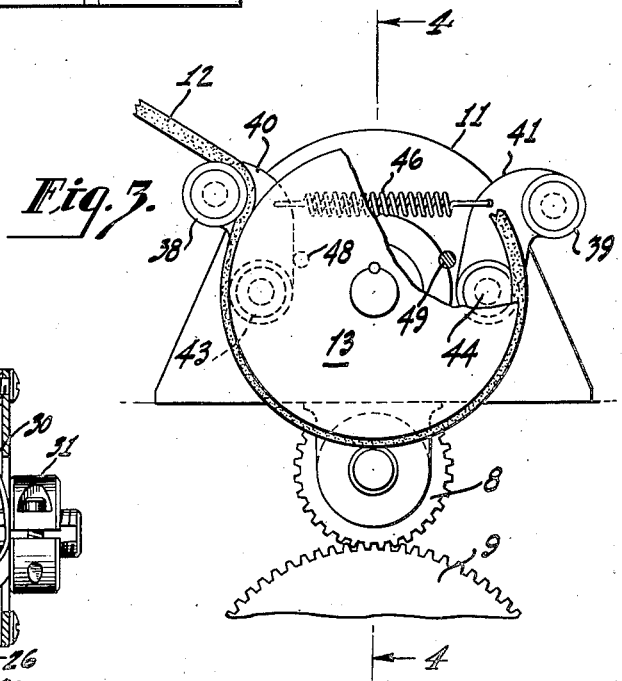
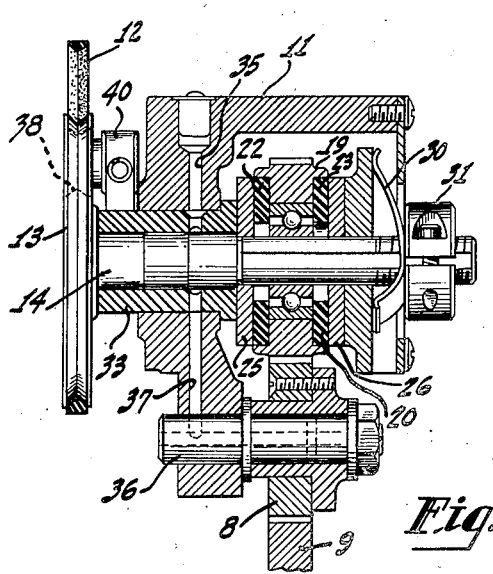
Inventor
MILFORD E. COLLINS,
Attorney Patented Mar. 7, 1950

2,499,850

UNITED STATES PATENT OFFICE 2,499,850

FILM REEL DRIVE

Milford E. Collins, Studio City, Calif., assignor to Radio Corporation of America, a corporation of Delaware Application March 26, 1947, Serial No. 737,381

8 Claims. (Cl. 74—242.11)

This invention relates to film drive apparatus and particularly to a drive for the take-up reel in a film magazine.

In picture cameras, sound recorders, and other types of equipment embodying film drives or film advancing mechanisms, the film is generally supplied from a supply reel and wound on a take-up reel. When the film is raw stock used in cameras and recorders, light tight magazines are employed, the take-up reel shaft being driven by a pulley or sprocket external of the magazine and a belt, chain or a train of gears. In the type of take-up in which a belt is used, it is necessary to provide idlers to maintain a uniform tension in the belt.

Many present day sound recorders for film are adapted to advance the film therethrough in either direction. Thus, a take-up form of drive is required which may be used for either reel in accordance with the direction of film advancement through the recorder.

The present invention is directed to a belt form of take-up drive which is particularly simple, which has the frictional drive feature necessary to compensate for variations in reel diameter, and which may be used to drive either reel while maintaining the same tension in the belt at all times. The friction compensator is fixedly attached to the recorder with its belt and when it is desired to drive either reel, it is only necessary to place the belt loop around the drive wheel or pulley of the particular reel to be driven. A novel idler construction permits the same tensioning spring to act when either reel is driven.

The principal feature of the invention, therefore, is to facilitate the drive of a take-up film reel.

Another object of the invention is to provide an improved take-up drive for a film magazine which is simple in construction and operation.

A further object of the invention is to provide a belt drive for the take-up reel of a film magazine which contains the film reel speed compensator and can drive either reel in the film magazine with equal efficiency.

A still further object of the invention is to provide a belt drive for either of the take-up reels in a film magazine and which utilizes the same idler tension for each reel.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a plan view of the invention associated with a sound recorder,

Fig. 2 is an elevational view of the invention as shown in Fig. 1,

Fig. 3 is an elevational view of the take-up drive showing the idler arrangement, and, Fig. 4 is a cross sectional view of the frictional drive taken along the line 4—4 of Fig. 3.

Referring now to the drawings in which the same numerals refer to identical elements, a film recorder 5 has mounted on the top thereof a drive unit 6 which is fixedly attached to and over an opening in the top of the recorder. The film supply and take-up reels, not shown, are within the magazine 7. The drive unit has a lower gear 8 which meshes with a drive gear 9 within the recorder, the unit being enclosed in a housing 11. As shown in Figs. 1 and 2, a belt 12 passes around a drive pulley 13 mounted on a shaft 14 and around a pulley 16 mounted on a reel shaft. The belt may also be placed around a pulley wheel 17 when the other reel is to be driven, the belt being shown shifted to that position in Fig. 3.

The shaft 14, rotatable in bearing 33 and oiled through oil hole 35, is driven through the gears 8 and 9, as mentioned above, the gear 8 being in mesh with a gear 19 rotatable on a ball bearing 20 mounted on the shaft 14. The gear 8 is mounted on a stub shaft 36 in the housing 11 and is oiled through oil hole 37. The gear 19 has attached on either side thereof friction felt-washers or discs 22 and 23 which abut a pair of metal friction washers or discs 25 and 26, respectively, the latter being fixedly attached to the shaft 14. The amount of friction between the washers 22, 23, 25 and 26 is determined by the tension in a spider spring 30 controlled by a lock nut 31. Thus, the wheel 13 is driven from the gear 9 through the gear 8, then gear 19 through the friction washers to shaft 14. The slippage between the friction washers is, of course, dependent upon the diameter of the roll of film on the reel being driven within the magazine 7.

To maintain the same tension in the belt 12 at all times and thus prevent slippage where it is not desired, regardless of whether the wheel 16 or the wheel 17 is being driven, a pair of idler wheels 38 and 39 are mounted on crank arms 40 and 41 which are pivoted on the sides of the casing 11 at points 43 and 44, respectively. The arms 40 and 41 are interconnected by a tensioning spring 46 and are limited in their movement toward one another by stop pins 48 and 49.

Thus, with the belt 12 around the pulley 16, as in Figs. 1 and 2, idler wheel 38 will be utilized and arm 41 will be pulled back against the pin

49. If the wheel 17 is being driven as shown in Fig. 3, the idler wheel 39 will be in use and the arm 40 will be stopped in a fixed position by the pin 48. In this manner the single spring 46 provides the tensioning means for both the idlers which tension will, therefore, be constant regardless of the take-up reel being driven. The construction provides that the distance between the axis of wheel 17 and the axis of drive pulley 13 is the same as the distance between the axis of the wheel 16 and the axis of pulley 13 and that wheels 16 and 17 have the same operating diameters.

The above take-up drive is simple and economical to manufacture and easy to maintain while providing the desired variable speed drive for either reel in a film magazine with equal efficiency.

I claim:

1. A film reel take-up drive comprising a shaft having a drive pulley thereon, a belt on said pulley, a pair of driven pulleys, one of said pair of driven pulleys being on either side of said drive pulley and either of which is adapted to be driven by said belt, a drive gear mounted for rotation on said shaft, friction means interposed between said gear and said shaft, a pair of idler pulleys, one of said idler pulleys being on either side of said drive pulley, and means for limiting the separation between said idler pulleys, the idler pulley on one side of said drive pulley being utilized when said belt is driving the driven pulley on the same side of said first mentioned pulley and the other of said idler pulleys being utilized when said belt is driving the other of said pair of driven pulleys.

2. A film reel take-up drive in accordance with claim 1 in which a spring is provided between said idler pulleys to tension said belt to the same degree regardless of the pulley being driven.

3. A film reel take-up drive in accordance with claim 2 in which arms are provided on which said idler pulleys are mounted, and said tensioning spring is connected to said arms.

4. A film reel take-up drive comprising a unit adapted to be attached to a film advancing mechanism, a shaft within said unit, a drive pulley on said shaft, a pair of film reel pulleys, a belt for interconnecting either one of said reel pulleys to said drive pulley, a gear on said shaft adapted to be driven by said film advancing mechanism, a friction clutch intermediate said gear and said shaft, and belt tightening means connected to said unit, said belt tightening means including a pair of arms pivoted on said unit on either side of said drive pulley, idler pulleys mounted on the ends of said arms, and a spring between said arms, said belt being tensioned by one of said idler pulleys and said spring when driving one of said reels, and said belt being tensioned by the other of said pulleys and said spring when driving the other of said reels.

5. A film reel take-up drive comprising a shaft, means for driving said shaft, a friction clutch between said shaft and said driving means therefor, a housing for said last mentioned means, a pair of arms pivotally mounted on said housing, idler pulleys rotatable on the ends of said arms, a tension spring interconnecting said arms, and a pair of stops for predetermining the distance between said arms when under the tension of said spring.

6. A film reel take-up drive in accordance with claim 5 in which said clutch includes a drive gear rotatable on said shaft, a pair of discs fixedly mounted on said shaft on either side of said gear, and friction washers interposed between said discs and said gear.

7. A film reel take-up drive unit comprising a housing, a film advancing mechanism, a shaft in said housing, a gear mounted on said shaft, means for connecting said gear to said film advancing mechanism, a drive pulley on said shaft, a pair of idler pulleys, a pair of arms, moveably mounted on said housing and supporting said pair of idler pulleys, a tensioning spring between said idler pulleys, a stop on said housing for each arm to limit the movement of one of said pulleys when the other pulley is under tension of said spring, a belt on said drive pulley, one of said idler pulleys contacting said belt under tension of said spring, and the other of said idler pulley arms anchoring said spring when said belt is driving on one side of said unit, and said other of said idler pulleys contacting said belt and said first idler pulley arm anchoring said spring when said belt is driving on the other side of said unit.

8. A film reel take-up drive unit in accordance with claim 7 in which a friction clutch is provided in said means between said gear and said film advancing mechanism.

MILFORD E. COLLINS.

REFERENCES CITED

The following references are of record in the file of this patent:

UNITED STATES PATENTS

| Number | Name | Date |
|---|---|---|
| 855,237 | Dunn | May 28, 1907 |
| 976,115 | Bard | Nov. 15, 1910 |
| 1,692,918 | Bachman | Nov. 27, 1928 |